(12) United States Patent
Wang et al.

(10) Patent No.: US 11,780,116 B2
(45) Date of Patent: Oct. 10, 2023

(54) METHOD FOR MODIFYING RECYCLED FINE POWDER OF CONCRETE AND USE THEREOF

(71) Applicant: Anhui University of Science and Technology, Huainan (CN)

(72) Inventors: Liang Wang, Huainan (CN); Zhiqiang Liu, Huainan (CN); Hao Wang, Huainan (CN); Wenfeng Shen, Huainan (CN); Ying Xu, Huainan (CN); Yubiao Wei, Huainan (CN); Fan Yang, Huainan (CN)

(73) Assignee: Anhui University of Science and Technology, Huainan (CN)

( * ) Notice: Subject to any disclaimer, the term of this patent is extended or adjusted under 35 U.S.C. 154(b) by 300 days.

(21) Appl. No.: 17/365,296

(22) Filed: Jul. 1, 2021

(65) Prior Publication Data

US 2022/0314491 A1   Oct. 6, 2022

(30) Foreign Application Priority Data

Apr. 1, 2021   (CN) .......................... 202110353420.8

(51) Int. Cl.
| | | |
|---|---|---|
| *B28C 5/00* | (2006.01) | |
| *B28C 7/00* | (2006.01) | |
| *B28C 5/12* | (2006.01) | |

(52) U.S. Cl.
CPC ................ *B28C 5/12* (2013.01); *B28C 5/003* (2013.01); *B28C 7/0007* (2013.01)

(58) Field of Classification Search
CPC ......... B03B 9/063; B03B 5/56; B28C 5/0875; B28C 5/4237; B28C 5/4244; B28C 5/12; B28C 5/003; B28C 7/0007; C04B 7/246; C04B 24/38; C04B 18/16; C04B 40/0046
USPC ...................................... 366/53–63, 68, 187
See application file for complete search history.

(56) References Cited

U.S. PATENT DOCUMENTS

| | | | | |
|---|---|---|---|---|
| 1,805,104 | A * | 5/1931 | Reed-Lewis | ............ C04B 28/04 106/737 |
| 8,967,358 | B2 * | 3/2015 | Shimizu | .................... B60P 3/16 198/360 |
| 11,325,135 | B1 * | 5/2022 | DeHart | ................. B28C 5/4244 |

FOREIGN PATENT DOCUMENTS

GB           191020782 A   *   8/1911

* cited by examiner

*Primary Examiner* — Charles Cooley
(74) *Attorney, Agent, or Firm* — Cook Alex Ltd.

(57) ABSTRACT

Methods for modifying a recycled fine powder of concrete and uses thereof. A method for modifying a recycled fine powder can include: crushing a collected waste concrete block with a crusher, grinding with a ball mill, and passing through a 100-mesh sieve, to obtain a recycled fine powder with d50 of 13.5 μm; placing the obtained recycled fine powder in a dry environment at a high temperature, drying, then taking out, and cooling to room temperature; preparing tannic acid solutions with different concentrations, mixing the cooled recycled fine powder with the prepared tannic acid solutions, and continuously stirring by a glass rod.

6 Claims, 4 Drawing Sheets

METHOD FOR MODIFYING RECYCLED FINE POWDER OF CONCRETE AND USE THEREOF

CROSS-REFERENCE TO RELATED APPLICATION(S)

This patent application is related to and claims priority benefits from Chinese Patent Application No. 202110353420.8 filed on Apr. 1, 2021, the disclosure of which is incorporated by reference herein in its entirety.

FIELD OF THE INVENTION

The disclosure relates to methods for modifying a recycled fine powder of concrete and uses thereof.

Recycled fine powder is a by-product in the production of recycled concrete aggregates, and has a particle size of less than 0.16 mm. In at least some embodiments, the recycled fine powder accounts for 10%-20% of the total mass of waste concrete, and comprises mainly hydrated calcium silicate (C—S—H), unhydrated cement particles, calcium hydroxide ($Ca(OH)_2$), silica, and the like. Among them, the unhydrated cement particles and calcium hydroxide have the ability of serving as the crystal nuclei of cement hydration and continuing hydration to form gel products. Therefore, the recycled fine powder can be used as a mineral admixture for cement to exert its filling and active effects. However, since silica and the hydrated calcium silicate occupy a considerable proportion in the recycled fine powder, the activity of the recycled fine powder is much lower than that of the cement. In at least some embodiments, the recycled fine powder contains a large amount of potentially active silicon-aluminum ingredients, which can improve the activity of the recycled fine powder by means of, such as but not limited to, mechanical grinding, heat treatment and/or chemical treatment.

A current treatment method is to increase the content of the active ingredients in the recycled fine powder by changing chemical components and phase composition of the recycled fine powder, thereby improving the compatibility with the cement. However, the recycled fine powder has a wide range of sources, which makes its composition complex, resulting in great differences in the effects of the current treatment methods. Therefore, new treatment methods with good effects and strong applicability are needed.

SUMMARY OF THE INVENTION

In some embodiments, a method involves surface modification of recycled fine powder, immersing the recycled fine powder in tannic acid. In at least some embodiments, through the complexation of tannic acid, polyphenol functional groups in the tannic acid are attached to the surface of the recycled fine powder; by means of the adhesion of the polyphenol functional groups and the attraction to calcium ions, the hydrated products are induced to be generated on the surface of the recycled fine powder, which promotes the formation of an interface microstructure and improves the bonding strength between the recycled fine powder and cement, thereby improving the performance of cement-based materials. In at least some embodiments, the modified recycled fine powder being used as mineral admixtures makes it possible to save resources, and at the same time reduces the carbon emissions of the cement industry and decreases the environmental load.

An object of the present disclosure is to modify a recycled fine powder by tannic acid, in which the complexation of tannic acid with metal ions is utilized to attach the polyphenol functional groups to the surface of the fine powder, and by means of the attraction of the polyphenol functional groups to the calcium ions, the hydrated products are induced to be generated on the surface of the fine powder, thereby improving the bonding performance between the recycled fine powder and the cement. In at least some embodiments, the use of tannic acid to modify the recycled fine powder can effectively use the waste concrete powder, save resources and protect the environment, and/or improve the performance of the concrete.

In some embodiments, a method for modifying recycled fine powder comprises the steps of:
  crushing a collected waste concrete block with a crusher, grinding with a ball mill, and passing through a 100-mesh sieve, to obtain a recycled fine powder with d50 of 13.5 um;
  placing the obtained recycled fine powder in a constant temperature drying oven at a high temperature, drying to a constant weight, then taking out, and cooling to room temperature; and
  preparing a plurality of tannic acid solutions with different concentrations, mixing the cooled recycled fine powder with the prepared tannic acid solutions, and continuously stirring by a glass rod.

In some embodiments, the drying is performed at a temperature of 110° C. for 6 hours.

In some embodiments, the plurality of tannic acid solutions have a mass fraction (accounting for the mass of water) of 0%, 0.1%, 0.3%, 0.5%, and 1%, respectively.

In some embodiments, the continuously stirring by a glass rod is performed for 2 minutes. In some embodiments, the stirring is essentially continuous. In some embodiments, the stirring is noncontinuous.

In some embodiments, tannic acid is an analytical reagent with a purity of not less than 95%.

The present disclosure also discloses uses of the modified recycled fine powder in a cement concrete. In some embodiments, recycled fine powders modified by tannic acid solutions with different concentrations are used to replace the cement with a replacement rate of 10%, respectively.

Methods and uses of the present disclosure can have the following beneficial effects:

In at least some embodiments, the tannic acid ($C_{76}H_{52}O_{46}$) used is a low-priced, non-toxic and harmless polyphenol compound, which is one of the main ingredients of plants such as tea, coffee, leaves, barks and immature fruits. Tannic acid is low priced, available from a wide number of sources, is non-toxic and harmless.

In at least some embodiments, the recycled fine powder modified by tannic acid can capture more calcium ions. Tannic acid induces the calcium ions to aggregate on the surface of the recycled fine powder, providing nucleation sites for the formation of hydrated calcium silicate and calcium hydroxide, so that more hydrated products are precipitated on the surface of the recycled fine powder, improving the bonding strength of the interface between the cement and the recycled fine powder, thereby increasing the compressive strength of the recycled fine powder concrete.

In at least some embodiments, tannic acid used in the present disclosure is not corrosive or an irritant, and can improve the durability of concrete.

In at least some embodiments, the use of tannic acid to modify the recycled fine powder makes it possible to effectively utilize the waste concrete powder, increase the utilization rate, save resources, protect the environment, and is beneficial to sustainable development.

BRIEF DESCRIPTION OF THE DRAWINGS

In order to better explain the technical solutions in embodiments of the present disclosure, the drawings are introduced briefly below.

DETAILED DESCRIPTION OF ILLUSTRATIVE EMBODIMENT(S)

Figure 1:
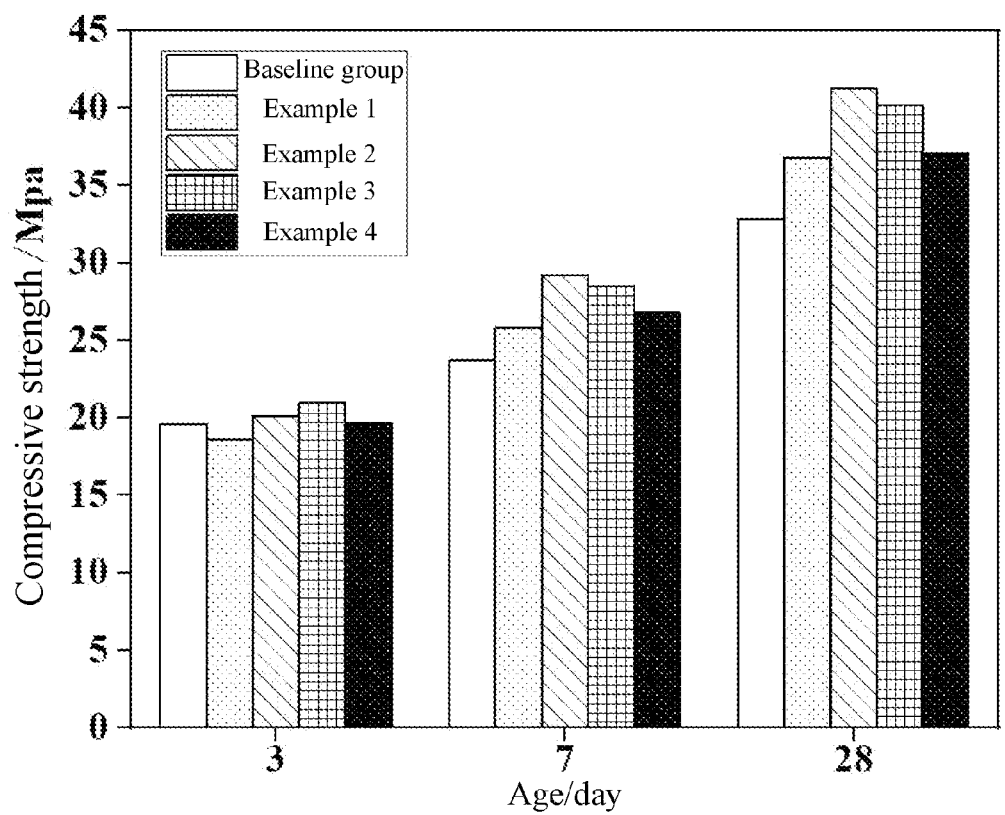
FIG. 1 is a graph illustrating the compressive strength of the recycled fine powder concrete modified by tannic acid solutions with different concentrations.
Figure 2:
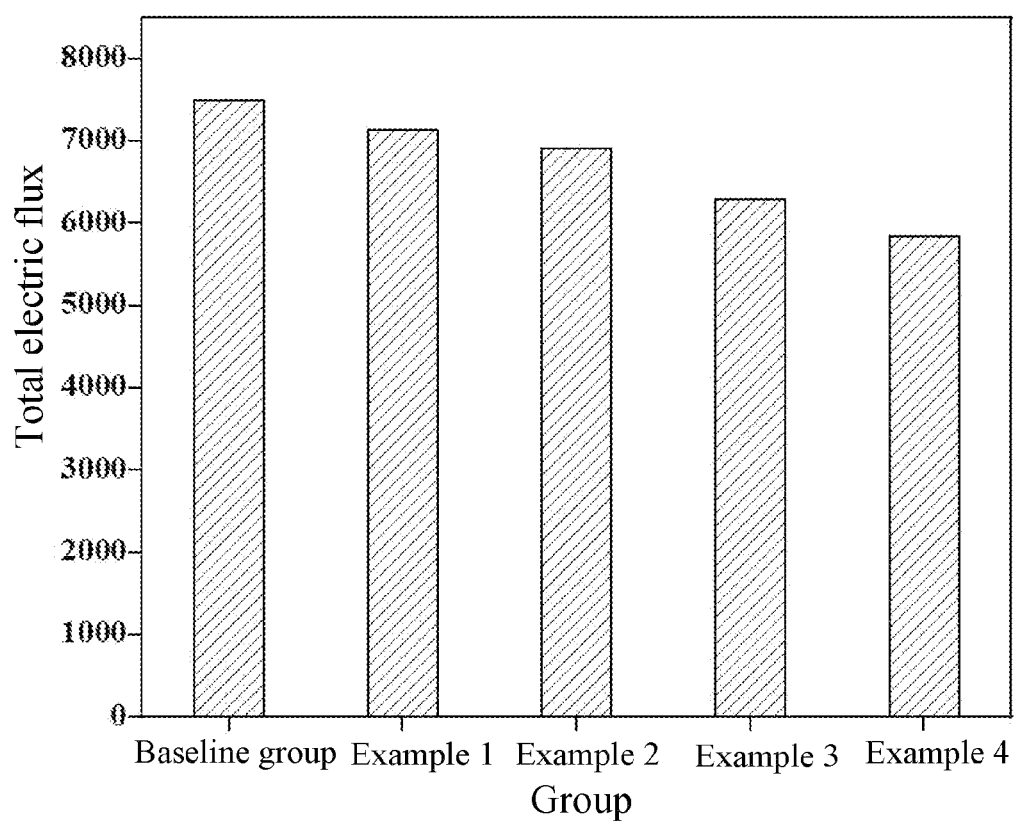
FIG. 2 is a graph illustrating the chloride ion electric flux of the recycled fine powder concrete modified by tannic acid solutions with different concentrations.

The above-mentioned and other technical features and advantages of the present disclosure will be described in more detail below in combination with the embodiments.

A method for modifying a recycled fine powder, can include the following steps:
  crushing a collected waste concrete block with a crusher, grinding with a ball mill, and passing through a 100-mesh sieve, to obtain a recycled fine powder with d50=13.5 wm;
  placing the obtained recycled fine powder in a dry environment at a high temperature, drying, then taking out, and cooling to room temperature; and
  preparing a plurality of tannic acid solutions with different concentrations, mixing the cooled recycled fine powder with the prepared tannic acid solutions, and continuously stirring by a glass rod.

In some embodiments, the drying is performed at a temperature of 105° C. for 2 hours.

In some embodiments, the tannic acid solutions have a mass fraction (accounting for the mass of water) of 0%, 0.1%, 0.3%, 0.5% and 1%, respectively.

In some embodiments, the continuously stirring by the glass rod is performed for 2 minutes.

In some embodiments, tannic acid is an analytical reagent with a purity of ≥95%.

In at least some embodiments, the tannic acid ($C_{76}H_{52}O_{46}$) used is a low-priced, non-toxic and harmless polyphenol compound, which is one of the main ingredients of plants such as tea, coffee, leaves, barks and immature fruits. Tannic acid is low priced, available from a wide number of sources, is non-toxic and harmless.

In some embodiments, the recycled fine powder modified by tannic acid can capture more calcium ions, in which tannic acid induces the calcium ions to aggregate on the surface of the recycled fine powder, providing nucleation sites for the formation of hydrated calcium silicate and calcium hydroxide, so that more hydrated products are precipitated on the surface of the recycled fine powder, improving the bonding strength of the interface between the cement and the recycled fine powder, thereby increasing the compressive strength of the recycled fine powder concrete.

In some embodiments, tannic acid is non-toxic, harmless and non-irritant, and can also improve the compressive strength and durability of concrete.

In some embodiments, the use of tannic acid to modify the recycled fine powder makes it possible to effectively utilize the waste concrete powder, increase the utilization rate, save resources, protect the environment, and is beneficial to sustainable development.

The modified recycled fine powder prepared in the present disclosure was used in a cement concrete mixture. In order to simplify the test, no coarse aggregate was added to the concrete, and the modified recycled fine powder was directly stirred together with cement and sand to form the concrete, according to the mixing ratio.

Example 1

At ambient temperature, 0.75 g of tannic acid and 710.25 g of water were weighed and added into a beaker, and stirred with a glass rod for 1 minute to prepare a tannic acid solution with a concentration of 0.1%. 141 g of the recycled fine powder was weighed and mixed with the prepared tannic acid solution, and stirred continuously with a glass rod for 2 minutes.

Example 2

At ambient temperature, 2.1 g of tannic acid and 708.9 g of water were weighed and added into a beaker, and stirred with a glass rod for 1 minute to prepare a tannic acid solution with a concentration of 0.3%. 141 g of the recycled fine powder was weighed and mixed with the prepared tannic acid solution, and stirred continuously with a glass rod for 2 minutes.

Example 3

At ambient temperature, 3.6 g of tannic acid and 707.4 g of water were weighed and added into a beaker, and stirred with a glass rod for 1 minute to prepare a tannic acid solution with a concentration of 0.5%. 141 g of the recycled fine powder was weighed and mixed with the prepared tannic acid solution, and stirred continuously with a glass rod for 2 minutes.

Example 4

At ambient temperature, 7.05 g of tannic acid and 703.95 g of water were weighed and added into a beaker, and stirred with a glass rod for 1 minute to prepare a tannic acid solution with a concentration of 1%. 141 g of the recycled fine powder was weighed and mixed with the prepared tannic acid solution, and stirred continuously with a glass rod for 2 minutes.

Example 5

The modified recycled fine powders obtained in Examples 1 to 4 were applied respectively to the concretes with the mixing ratios listed in the following table (expressed in kg/m$^3$).

Figure 4:
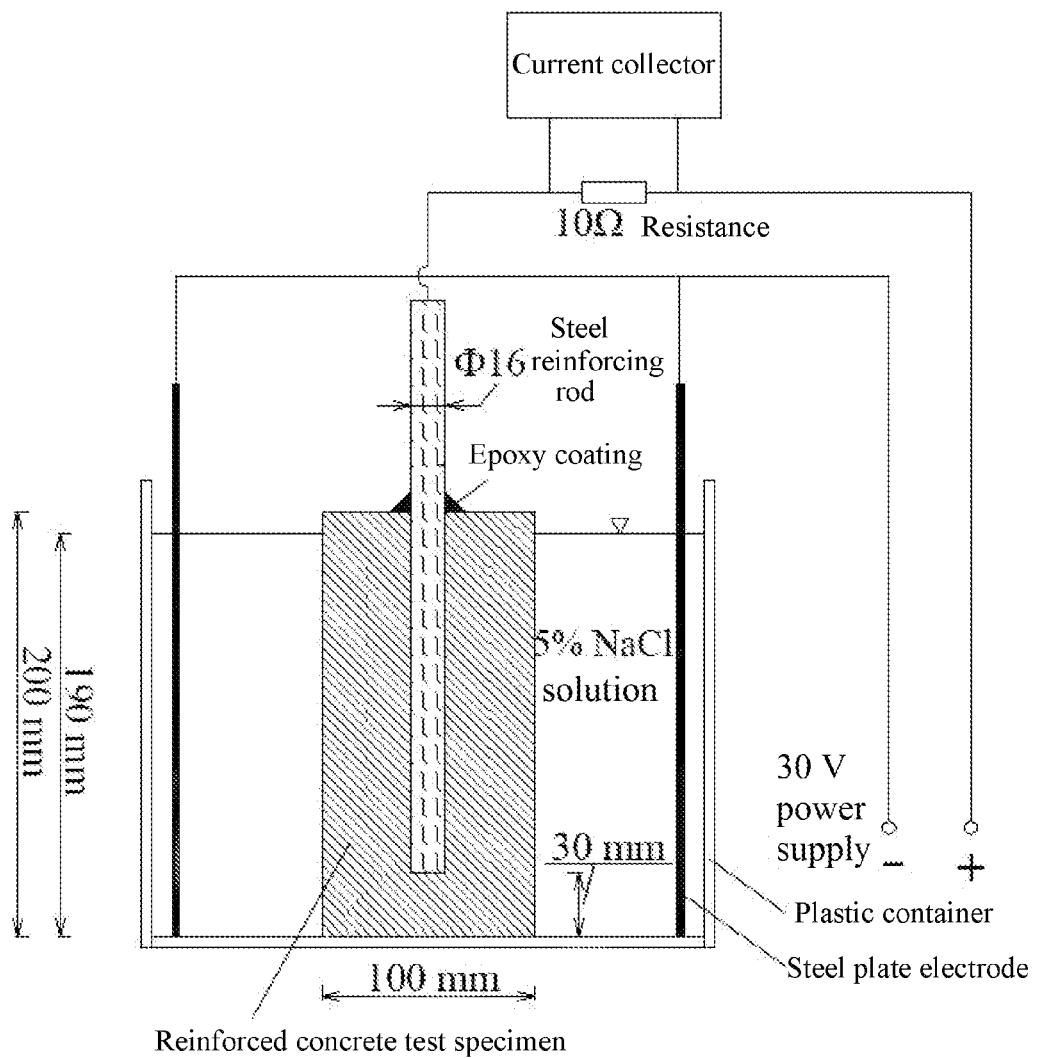
FIG. 4 is a schematic diagram of the accelerated electrochemical corrosion test system for steel bars.

The compressive strength and the chloride ion electric flux were tested, wherein the compressive strength was tested according to GB/T 50107-2010 "Standard for evaluation of concrete compressive strength", and the chloride ion electric flux was tested according to GB/T 50082-2009 "Standard for test methods of long-term performance and durability of ordinary concrete". The accelerated electrochemical corrosion test system is shown in FIG. 4.

TABLE 1

The mixing ratios of cement concrete mixtures (kg/m³)

| Example No. | Cement | Standard sand | recycled fine powder | Tannic acid | Water |
|---|---|---|---|---|---|
| Baseline group | 547 | 1430 | 54.7 | 0 | 275 |
| Example 1 | 547 | 1430 | 54.7 | 0.275 | 275 |
| Example 2 | 547 | 1430 | 54.7 | 0.825 | 275 |
| Example 3 | 547 | 1430 | 54.7 | 1.375 | 275 |
| Example 4 | 547 | 1430 | 54.7 | 2.75 | 275 |

TABLE 2

Test results of the compressive strength and the chloride ion electric flux

| | Compressive strength | | | Electric flux |
|---|---|---|---|---|
| Example No. | 3 d (MPa) | 7 d (MPa) | 28 d (MPa) | 28 d (C) |
| Baseline group | 19.65 | 23.69 | 32.84 | 7498 |
| Example 1 | 18.59 | 25.82 | 36.86 | 7139 |
| Example 2 | 20.11 | 29.23 | 41.24 | 6916 |
| Example 3 | 20.96 | 28.51 | 40.22 | 6293 |
| Example 4 | 19.67 | 26.82 | 37.15 | 5850 |

According to Table 2, it can be seen from the test results of the compressive strength that when the mass concentration of tannic acid is 0.3%, a better advantage is achieved, being most advantageous to the development of the compressive strength of hardened concrete. Compared with the baseline group, when the mass concentration of tannic acid is 0.3%, the compressive strength at 3 d, 7 d and 28 d is increased by 2.3%, 23.5% and 20.4%, respectively. According to Table 2, it can be seen from the test results of the chloride ion electric flux that the electric flux of the recycled fine powder concrete treated with tannic acid is lower than that of untreated recycled fine powder concrete, and decreases as the concentration of tannic acid increases.

Figure 3:
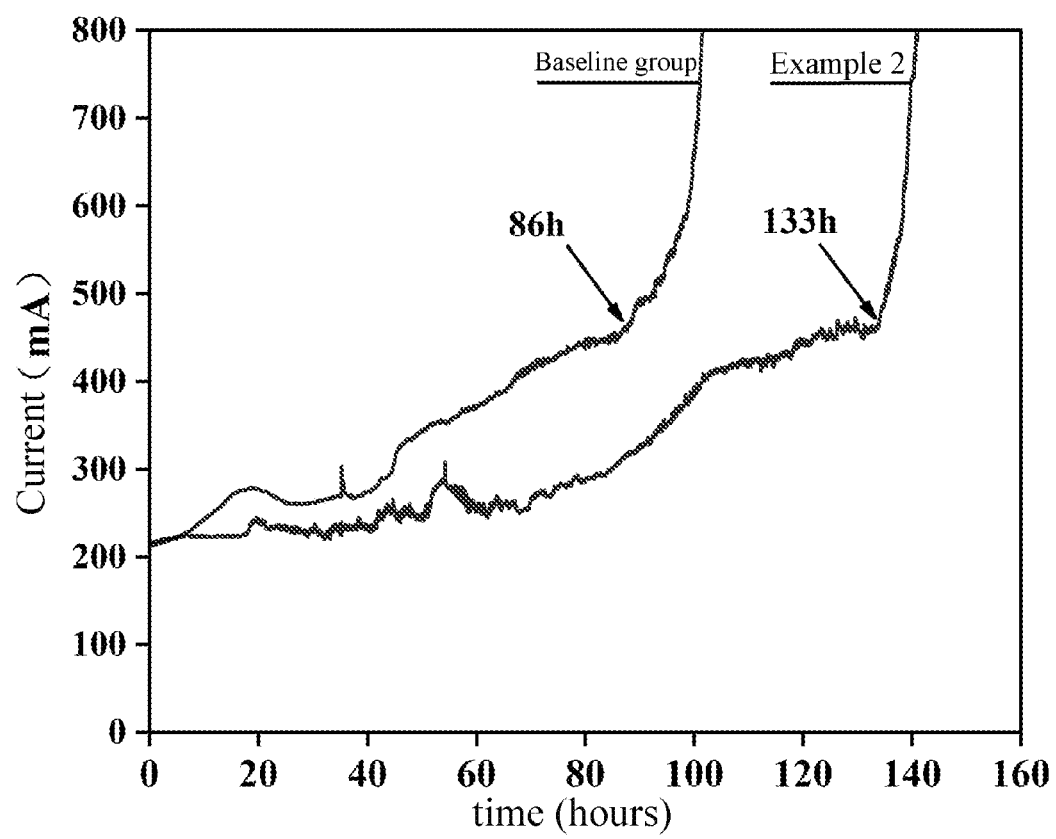
FIG. 3 is a graph showing the accelerated electrochemical corrosion test results of the steel bars in the concrete of Example 2 and the baseline group, reflecting the current changes in the steel bars in the concrete during the accelerated electrochemical corrosion test, in which when the current changes suddenly, the concrete cracks and the test specimen is damaged. Such time is used to evaluate the electrochemical corrosion performance of the steel bars in the concrete.

This is at least partly, if not primarily, because the recycled fine powder modified by tannic acid can capture more calcium ions; tannic acid induces the calcium ions to aggregate on the surface of recycled fine powder, providing nucleation sites for the formation of hydrated calcium silicate and calcium hydroxide, so that more hydrated products are precipitated on the surface of the recycled fine powder, promoting the hydration of the cement and improving the bonding strength of the interface between the cement and the recycled fine powder, and thereby improving the compressive strength of the recycled fine powder concrete. The Tannic acid used is not corrosive or an irritant, and can also improve the corrosion resistance against chloride salts of the steel bars in the concrete. As shown in FIG. 3, the corrosion current of the baseline group test specimen begins to increase significantly after being immersed in NaCl solution for 86 hours, while the corrosion current of the test specimen in Example 2 begins to increase significantly after being immersed in NaCl solution for 133 hours, indicating that tannic acid can effectively improve the corrosion resistance against chloride salts of reinforced concrete and increase the durability of concrete.

The foregoing descriptions are only preferred embodiments of the present disclosure, which are merely illustrative rather than restrictive to the present disclosure. Those skilled in the art understand that many modifications, amendments and even equivalents may be made to the present disclosure without departing from the spirit and scope defined by the claims of the present disclosure, and they will all fall within the protection scope of the present disclosure.

What is claimed is:

1. A method for modifying a recycled fine powder of concrete, comprising:
    crushing a collected waste concrete block with a crusher, grinding with a ball mill, and passing through a 100-mesh sieve, to obtain said recycled fine powder with d50 of 13.5 μm;
    placing said recycled fine powder in a dry environment at a high temperature, drying, then taking out, and cooling to room temperature; and
    preparing a plurality of tannic acid solutions with different concentrations, mixing said recycled fine powder with said plurality of tannic acid solutions, and continuously stirring by a glass rod.

2. The method of claim 1, wherein the drying is performed at a temperature of 105° C. for 2 hours.

3. The method of claim 1, wherein the tannic acid solutions have a mass fraction (accounting for the mass of water) of 0%, 0.3% and 0.5%, respectively.

4. The method of claim 1, wherein continuously stirring by said glass rod is performed for 2 minutes.

5. The method of claim 1, wherein said plurality of tannic acid solutions are analytical reagents with a purity of ≥95%.

6. A method for using the recycled fine powder modified by the method of claim 1 in a concrete, comprising using the recycled fine powder modified by the plurality of tannic acid solutions with different concentrations to replace cement with a replacement rate of 10%.

* * * * *